United States Patent [19]
Masuda

[11] Patent Number: 6,145,923
[45] Date of Patent: *Nov. 14, 2000

[54] AUTOMOBILE FRONTBODY STRUCTURE

[75] Inventor: Toshio Masuda, Tokyo, Japan

[73] Assignee: Fuji Jukogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/152,225

[22] Filed: Sep. 11, 1998

[30] Foreign Application Priority Data

Sep. 16, 1997 [JP] Japan ................................. 9-269280

[51] Int. Cl.$^7$ .................................................. B60R 19/00
[52] U.S. Cl. ...................... 296/194; 296/189; 296/203.02
[58] Field of Search ..................................... 296/188, 189, 296/192, 194, 203.01, 203.02, 209, 30

[56] References Cited

U.S. PATENT DOCUMENTS

| | | | |
|---|---|---|---|
| 4,186,957 | 2/1980 | Lutze et al. ............................. | 296/188 |
| 4,188,059 | 2/1980 | Bauer et al. ............................. | 296/188 |
| 4,189,177 | 2/1980 | Schwuchow et al. ................... | 296/188 |
| 4,712,829 | 12/1987 | Hurten et al. ............................ | 296/203 |
| 4,789,199 | 12/1988 | Komatsu .................................. | 296/194 |
| 4,804,222 | 2/1989 | Sakiyama et al. ...................... | 296/203 |
| 5,011,201 | 4/1991 | Takahashi et al. ...................... | 296/203 |

FOREIGN PATENT DOCUMENTS

| | | | |
|---|---|---|---|
| 63-43881 | 3/1988 | Japan . | |
| 405085419 | 4/1993 | Japan .................................... | 296/194 |
| 2304650 | 3/1997 | United Kingdom .................. | 296/204 |

*Primary Examiner*—D. Glenn Dayoan
*Assistant Examiner*—Paul Chenevert
*Attorney, Agent, or Firm*—Martin A. Farber

[57] ABSTRACT

An outer reinforcement panel supports a toe board which connects a front frame and a floor panel from the undersurface of the toe board and an inner reinforcement panel supports the toe board from the topsurface of the toe board. On the outer reinforcement panel, three frames having U-shaped cross sections are integrally formed with the outer reinforcement panel in a radial manner and these frames are welded at the ends thereof to primary body skeletons such as a side sill, a wheel house, a side frame and the like. Similarly, on the inner reinforcement panel, two frames having inverse U-shaped cross sections are integrally formed with the inner reinforcement panel in a radial manner and these frames are also welded at the ends thereof to those primary body skeletons. Thus, a plurality of frames having closed cross sections are formed on inner and outer surfaces of the toe board and the floor panel. Even in the event of an offset collision or an oblique collision, since an impact energy is transmitted well diffusively to these body skeletons through these frames, the damage to passengers can be minimized.

11 Claims, 2 Drawing Sheets

AUTOMOBILE FRONTBODY STRUCTURE

BACKGROUND OF THE INVENTION

1. Field of the Invention

The present invention relates to a frontbody structure for an automobile and more particularly to a frame structure of a frontal portion of an automobile body.

2. Description of the Prior Art

In a frame structure of the front portion of a conventional automobile, respective rear ends of left and right front frames extending longitudinally along respective left and right side walls of an engine room are connected at an inclined portion of a toe board partitioning between the engine room and a passenger compartment with front ends of left and right side frames connected to the underneath of a floor, in the event of a collision, so as to diffusively transfer an impact load inputted from the front frame to the floor and the like through the toe board and the side frame.

A drawback of this frame structure is a difficulty in transferring the impact load to the side frame in a stable manner in the event of a collision and as a result it has such a problem that a lower curved portion of the toe board is deformed being projected in the direction of the passenger compartment due to a concentrated impact load.

Hitherto, numerous approaches have been made to increase the rigidity of the connecting portion of the front frame with the toe board. For example, Japanese Utility Model Application Laid-open No. Jitsu-Kai-Shou 63-43881 discloses an approach in which a reinforcement member is secured from the passenger compartment side to the lower curved portion of the toe board at the connecting portion of the front frame with the toe board so as to be connected at one end thereof with an upper central portion of the toe board and at the other end thereof with the side frame. This approach contemplates that the reinforced curved portion of the toe board enables a diffusion of the impact load transmitted from the front frame to the toe board toward the side frame and the floor tunnel.

However, this prior art such as exemplified by the aforesaid approach is still inadequate in the diffusion of the impact load at the event of an offset collision or an oblique collision. Yet, an additional use of the reinforcement member leads to a further increase of the vehicle weight and this is retrogressive in terms of the weight reduction.

SUMMARY OF THE INVENTION

Accordingly, the present invention has been made with a view to substantially eliminating the above discussed problems inherent in the prior art frontbody structure and its object is to provide an improved frontbody structure of an automobile having an increased rigidity. To achieve this object, the present invention provides a frontbody structure which comprises:

a pair of left and right outer reinforcement panels, each of the outer reinforcement panels rigidly secured from below to an undersurface of a toe board and rigidly secured at a front end thereof to a rear end of each of left and right front frames with an rear end thereof rigidly secured from below to an undersurface of a floor panel;

a pair of left and right inner reinforcement panels, each of the inner reinforcement panels rigidly secured from above to a topsurface of the toe board and rigidly secured from above at a rear end thereof to a topsurface of the floor panel;

a first outer frame having a closed cross section and formed integrally with each of the outer reinforcement panels, the first outer frame being pronged backward in a radial manner and rigidly secured at an rear end thereof to each of left and right wheel houses and each of left and right side sills, respectively;

a second outer frame having a closed cross section and formed integrally with each of the outer reinforcement panels, the second outer frame being pronged backward in a radial manner and rigidly secured at an rear end thereof to each of left and right side frames;

a third outer frame having a closed cross section and formed integrally with each of the outer reinforcement panels, the third outer frame being pronged backward in a radial manner and rigidly secured at an rear end thereof to a center tunnel;

a first inner frame having a closed cross section and formed integrally with each of the inner reinforcement panels, the first inner frame being pronged backward in a radial manner and rigidly secured at an rear end thereof to each of the wheel houses and each of the side sills, respectively; and a second inner frame having a closed cross section and formed integrally with each of the outer reinforcement panels, the second inner frame being pronged backward in a radial manner and rigidly secured at an rear end thereof to each of the side frames.

BRIEF DESCRIPTION OF THE DRAWINGS

The object and feature of the present invention will become more clearly understood from the following description of a preferred embodiment thereof with reference to the accompanying drawings, in which:

FIG. 2*a* is a fragmentary sectional view taken along the line A—A of FIG. 1*a.

DETAILED DESCRIPTION OF PREFERRED EMBODIMENTS

Figure 1A:
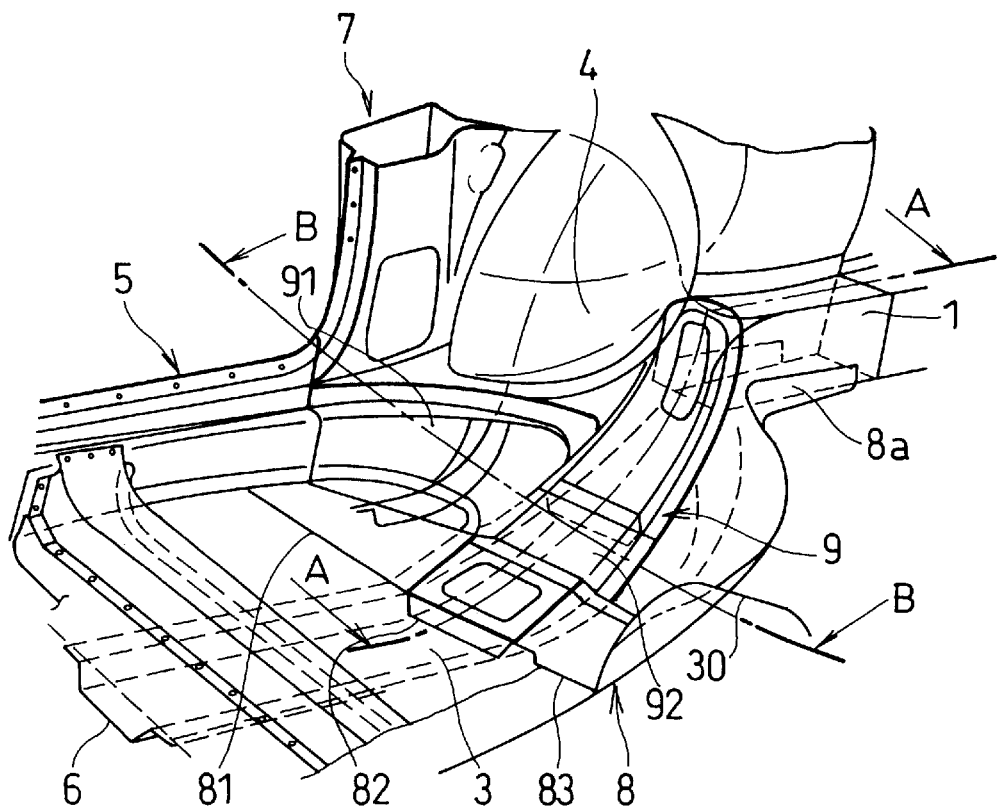
FIG. 1*a* is a fragmentary perspective view of a front body structure as viewed from the rear center of the passenger compartment.
Figure 1B:
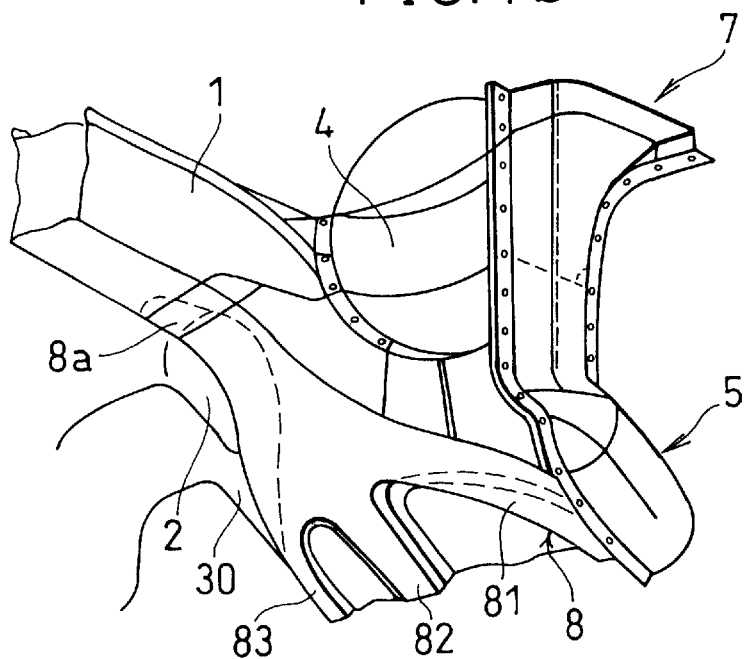
FIG. 1*b* is a fragmentary perspective view of a front body structure as viewed from the front of the vehicle.

Referring now to FIG. 1*a,* reference numerals 1, 1 are left and right front frames provided longitudinally along left and right side walls of an engine room chamber. The front frames 1, 1 are butt-welded at their respective rear ends to a curved portion ranging from a vertical portion of a toe board 2 for partitioning between the engine room and the passenger compartment to its rearwardly slanted portion.

The toe board 2 is reinforced by an outer reinforcement panel 8 and an inner reinforcement panel 9 from its curved portion to its connecting portion with a floor panel 3. Further, the front frame 1 is connected at the rear ends thereof with the front end of the outer reinforcement panel 8.

The outer reinforcement panel 8 is formed in such a way that its width becomes gradually broader as it goes rearward and has a front frame connecting portion 8*a* connecting the rear end of the front frame 1 with the outer reinforcement panel 8 such that the outer reinforcement panel 8 encloses the front frame 1 from below. Further, the outer reinforcement panel 8 is rigidly secured at the rear end thereof to the toe board 2 and the floor panel 3, respectively. Further, three outer frames having U-shaped cross sections are formed integrally with the outer reinforcement panel 8. That is, a first outer frame 81, a second outer frame 82 and a third outer frame 83 are formed being pronged slightly downward of the front frame connecting portion 8*a* backward in a radial manner. The first outer frame 81 is spot-welded at the rear end thereof to a wheel house 4 and the lower end of a front pillar 7 (front end of a side sill 5), respectively, the second outer frame 82 is spot-welded at the rear end thereof to a side frame 6 which is connected with the floor panel 3 from underneath and the third outer frame 83 is spot-welded at the rear end thereof to the front bottom portion of a floor tunnel 30 which is formed at the central portion in the widthwise direction of the floor panel 3.

Figure 2A:
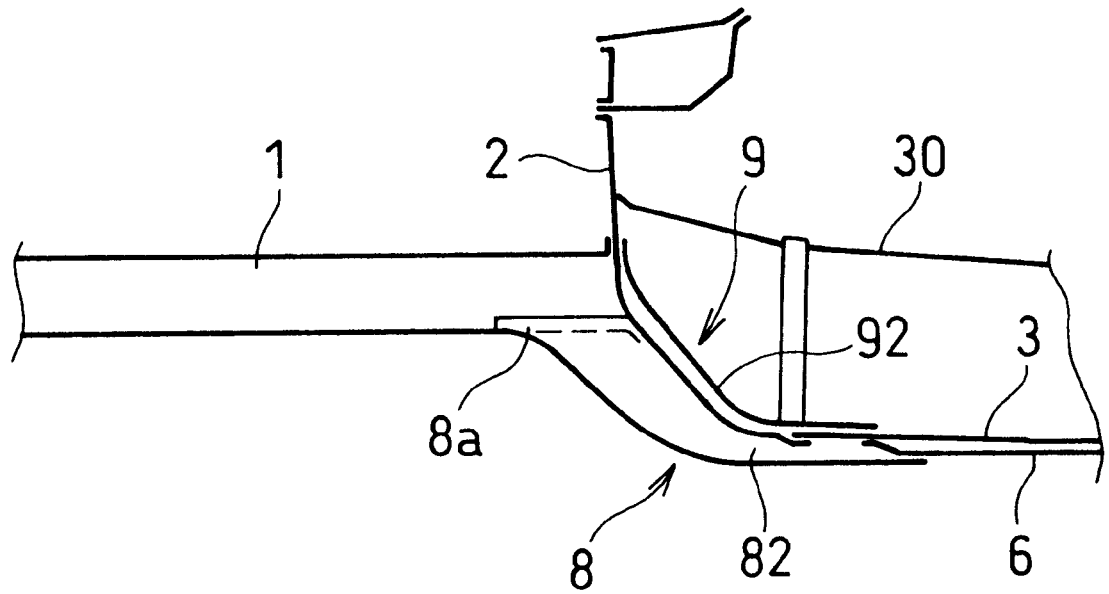
Figure 2B:
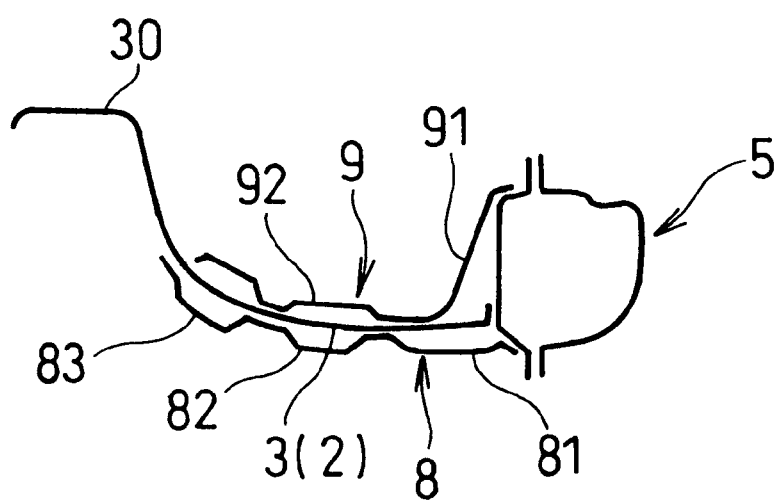
* and FIG. 2*b* is a fragmentary sectional view taken along the line B—B of FIG 1*a*.

On the inner reinforcement panel 9, a first inner frame 91 with an inverse U-shaped cross section and a second inner frame 92 with an inverse U-shaped cross section are formed integrally with the inner reinforcement panel 9 in the same manner as in the case of the outer reinforcement panel 8. The first inner frame 91 serves as connecting the rear end of the front frame 1 with the wheel house 4 and the front end of the side sill 5, respectively and the second inner frame 92 serves as connecting the rear end of the front frame 1 with the front end of the side frame 6. Specifically, as illustrated in FIGS. 2a and 2b, the first inner frame 91 is spot-welded at the rear end thereof to the wheel house 4 and the inner panel of the side sill 5, respectively. Further, the second inner frame 92 is spot-welded at the front portion thereof to the vertical portion of the toe board 2 and it is spot-welded at the rear end thereof to the side frame 6 with the floor panel 3 between.

In this thus constituted structure, a plurality of outer and inner frames having respective closed cross sections are formed in a radial manner on both surfaces of the toe board 2 and the floor panel 3. Accordingly, an impact load inputted from the front end of the front frame 1 is widely transmitted through these frames to a plurality of primary body skeleton members such as the wheel house 4, the side sill 5, the side frame 6, the floor panel 3 and the center tunnel 30. Further, even in case of an offset collision or an oblique collision, the impact load is transmitted and absorbed effectively because it spreads radially through these frames. Further, since respective flat portions between two opposite frames function as doublers (two laminated sheets), these further raise the rigidity of the toe board 2 and the floor panel 3.

According to the present invention, a plurality of frames having closed cross sections are formed rearwardly in a radial manner by rigidly connecting the outer reinforcement panel to the inner reinforcement panel with the toe board and the floor panel between and these frames connect the rear end of the front frame with the primary body structures such as side sills, side frames, floor tunnel and the like. Thus formed, the frontbody structure brings not only a great increase of the rigidity of the toe board, the floor panel and the surrounding components, but also reductions of the number of components and labor hours. Further, since the radially formed frames, even in the event of an offset collision or an oblique collision, diffusively transmit the impact load to the primary body skeletons, the deformation of the toe board and the floor panel can be minimized, this leading to small damages of occupants.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A front-body structure for a vehicle comprising:
   a front pillar erected at a side of said vehicle for forming a passenger compartment, a side sill connected to a lower end of said front pillar and extending in a rearward direction of said vehicle;
   a front frame extending longitudinally along said vehicle in a forward direction under said vehicle and along an inside position from a side wall of said vehicle for providing a space for a front wheel and for supporting an engine;
   a toe board rigidly connected to a rear end of said front frame and diagonally inclined in a rearward direction for resting a foot of a passenger thereon, and a floor panel connected to said toe board for horizontally traversing in a widthwise direction of said vehicle, said floor panel forming a flat bottom floor of the passenger compartment;
   a center tunnel mounted on a center portion of said floor panel and connected to said toe board;
   an outer reinforcement panel rigidly secured to an under-surface of said toe board and connected to said rear end of said front frame and to said end of said floor panel;
   an inner reinforcement panel rigidly secured on a top-surface of said toe board and connected to said rear end of said front frame and to said rear end of said floor panel;
   a front frame connecting portion formed at a front portion of said outer reinforcement panel so as to cover a lower side of said front frame;
   a first channel portion with a U-shaped cross-section formed in said outer reinforcement panel from said front frame connecting portion to said side sill so as to extend under said floor panel in a rearward and outwardly radial direction in order to effectively disperse a shock from forward direction without breaking;
   a second channel portion with said U-shaped cross-section formed in said outer reinforcement panel continuously from said front frame connecting portion straight along a forward direction of said vehicle so as to extend under said floor panel in a rearward and a radial direction;
   a third channel portion with said U-shaped cross-section formed in said outer reinforcement panel from said front frame connecting portion to said center tunnel so as to extend under said floor panel in a rearward and an inwardly radial direction;
   a first covering portion formed in said inner reinforcement panel continuously from said rear end of said front frame via said toe board to said side sill so as to extend over said floor panel in said rearward and said outwardly radial directions; and
   a fourth channel portion with an upright U-shaped cross-section formed in said inner reinforcement panel and extending from said rear end of said front frame to said center tunnel via said toe board so as to extend over said floor panel in said rearward and said inwardly radial directions, said fourth channel portion serving to effectively absorb a shock from any direction upon collision of said vehicle with another object;
   wherein the rear portion of the front frame is covered through the toe board by a front frame securing portion of the outer reinforcement panel and on one end of the inner reinforcement panel, so that impact force can be smoothly dispersed backwardly.

2. The front-body structure according to claim 1, further comprising:
   a plurality of outer frames having closed cross-sections and formed integrally with said outer reinforcement panel, said outer frames being secured in a radial manner; and
   a plurality of inner frames having closed cross-sections and formed integrally with said inner reinforcement panel, said inner frames being secured in a radial manner.

3. A front-body structure for a vehicle, comprising:

a front frame extending longitudinally along the vehicle, a toe board rigidly connected to a rear end of said front frame, a floor panel traversing the front frame in a widthwise direction of said vehicle, a pair of left and right wheel housings, a pair of left and right side sills extending in a longitudinal direction of said vehicle, a center tunnel extending in a longitudinal direction of said vehicle and placed in a center of said vehicle, and a pair of left and right side frames extending in a longitudinal direction of said vehicle between said center tunnel and each of said side sills;

a pair of left and right outer reinforcement panels, each of said outer reinforcement panels being rigidly secured from below to an undersurface of said toe board, and rigidly secured at a front end thereof to said rear end of said front frame, and with a rear end thereof being rigidly secured from below to an undersurface of said floor panel;

a pair of left and right inner reinforcement panels, each of said inner reinforcement panels being rigidly secured from above at a front end thereof to a top-surface of said toe board, and being rigidly secured from above at a rear end thereof to a top-surface of said floor panel;

a first outer frame having a closed cross-section and formed integrally with each of said outer reinforcement panels, said first outer frame being secured in a radial manner and rigidly secured at a rear end thereof to each of said wheel housing and each of said side sills, respectively;

a second outer frame having a closed cross-section and formed integrally with each of said outer reinforcement panels, said second outer frame being secured in a radial manner and rigidly secured at a rear end thereof to each of said side frames;

a third outer frame having a closed cross-section and formed integrally with each of said outer reinforcement panels, said third outer frame being secured in a radial manner and rigidly secured at a rear end thereof to said center tunnel;

a first inner frame having a closed cross-section and formed integrally with each of said inner reinforcement panels, said first inner frame being secured in a radial manner and rigidly secured at a rear end thereof to each of said wheel housings and each of said side sills, respectively in order to effectively disperse a shock from forward direction without breaking; and a second inner frame having a closed cross-section and formed integrally with each said inner reinforcement panels, said second inner frame being secured in a radial manner and rigidly secured at a rear end thereof to each of said side frames;

wherein the rear portion of the front frame is covered through the toe board by a front frame securing portion of the outer reinforcement panel and on one end of the inner reinforcement panel, so that impact force can be smoothly dispersed backwardly.

4. The front-body structure according to claim 3, wherein said first, second and third outer frames have a three-pronged configuration, and said first and second inner frames have a two-pronged configuration.

5. The front-body structure according to claim 3 wherein said closed cross-sections of said outer frames are formed by said outer reinforcement panel, and either of said toe board or said floor panel or both of them.

6. The front-body structure according to claim 3, wherein said closed cross-sections of said inner frames are formed by said inner reinforcement panel, and either of said toe board or said floor panel or both of them.

7. The front-body structure according to claim 3, wherein said closed cross-sections of said first, second and third outer frames are formed by said outer reinforcement panel, and either of said toe board or said floor panel or both of them.

8. The front-body structure according to claim 3, wherein said closed cross-sections of said first and second inner frames are formed by said inner reinforcement panel, and either of said toe board or said floor panel or both of them.

9. A front body structure for a vehicle comprising:

a front frame extending in a longitudinal direction of the vehicle;

a toe board extending in a widthwise direction of said vehicle and rigidly connected to a rear end of said front frame;

a floor panel extending in a widthwise direction of said vehicle and connected to said toe board;

a side sill extending in the longitudinal direction of said vehicle;

a center tunnel portion extending in said longitudinal direction and disposed at a center of the vehicle in the widthwise direction;

a side frame extending in the longitudinal direction and disposed between said center tunnel portion and said side sill;

an outer reinforcement panel connected to a lower surface of said toe board and a lower surface of said floor panel; and an inner reinforcement panel connected to an upper surface of said toe board and an upper surface of said floor panel;

wherein said outer reinforcement panel comprises:

a front end portion connected to the rear end of the front frame;

a first rear end portion connected to said side sill; and a second rear end portion connected to said side frame; and wherein said inner reinforcement panel comprises:

a front end part disposed adjacent to said rear end of the front frame and substantially form a doubler with said front end portion through said toe board in order to effectively disperse a shock from forward direction without breaking;

a first rear end part connected to said side sill and substantially forms a doubler with said first rear end portion through at least one of said toe board and said floor panel; and a second rear end part connected to said side frame and substantially forms a doubler with said second rear end portion through at least one of said toe board and said floor panel.

10. The front body structure according to claim 9 wherein each of said front end portions, said first rear end portion, said second rear end portion, said front end part, said first rear end part and said second rear end part extends in the longitudinal direction and has a U-shaped cross section which opens towards at least one of said toe board and said floor panel.

11. The front body structure according to claim 9, wherein said outer reinforcement panel further comprises a third rear end portion connected to said center tunnel portion.

* * * * *